United States Patent
Ehrlich

Patent Number: 5,938,274
Date of Patent: Aug. 17, 1999

[54] COINING OFFSET INTO EDGE OF COMPOSITE PLATE MEMBERS FOR FORMING TRAILER DOORS AND WALLS

[75] Inventor: Rodney P. Ehrlich, Monticello, Ind.

[73] Assignee: Wabash National Corporation, Lafayette, Ind.

[21] Appl. No.: 08/970,790

[22] Filed: Nov. 14, 1997

[51] Int. Cl.⁶ ................................................. B60R 27/00
[52] U.S. Cl. ......................... 296/191; 296/181; 52/588.1
[58] Field of Search .................................. 296/181, 183, 296/191; 52/588.1

[56] References Cited

U.S. PATENT DOCUMENTS

| | | | |
|---|---|---|---|
| 3,386,218 | 6/1968 | Scott | 52/588.1 |
| 4,045,927 | 9/1977 | Diaz . | |
| 4,104,840 | 8/1978 | Heintz et al. | 52/588.1 |
| 4,703,948 | 11/1987 | Ehrlich . | |
| 4,810,027 | 3/1989 | Ehrlich | 296/181 |
| 4,940,279 | 7/1990 | Abott et al. | 296/181 |
| 4,958,472 | 9/1990 | Ehrlich . | |
| 5,285,609 | 2/1994 | Goad | 52/588.1 |
| 5,507,405 | 4/1996 | Thomas et al. | 220/1.5 |
| 5,664,826 | 9/1997 | Wilkens | 296/181 |
| 5,673,524 | 10/1997 | Gailey | 52/588.1 |

FOREIGN PATENT DOCUMENTS

| | | | |
|---|---|---|---|
| 772852 | 12/1967 | Canada | 52/588.1 |
| 1630595 | 8/1971 | Germany | 296/183 |
| 2552622 | 5/1977 | Germany | 52/588.1 |
| 946984 | 1/1964 | United Kingdom | 52/586.1 |
| 1567161 | 5/1980 | United Kingdom | 52/588.1 |
| 2107258 | 4/1983 | United Kingdom | 296/901 |

*Primary Examiner*—Dennis H. Pedder
*Attorney, Agent, or Firm*—Trexler, Bushnell, Giangiorgi & Blackstone, Ltd.

[57] ABSTRACT

A trailer wall or door is formed from a plurality of first and second composite plate members, each having a novel joint therebetween. Each composite plate member is formed from first and second metal skins having a compressible plastic core sandwiched therebetween. A first overlapping skin member of the first composite plate member overlaps a portion of the second composite plate member. A second overlapping skin member of the second composite plate member overlaps a portion of the first composite plate member. A portion of the second skin of the second composite plate member is stepped and the first overlapping skin member is seated thereagainst. Rivets are provided for joining the plate members together.

18 Claims, 1 Drawing Sheet

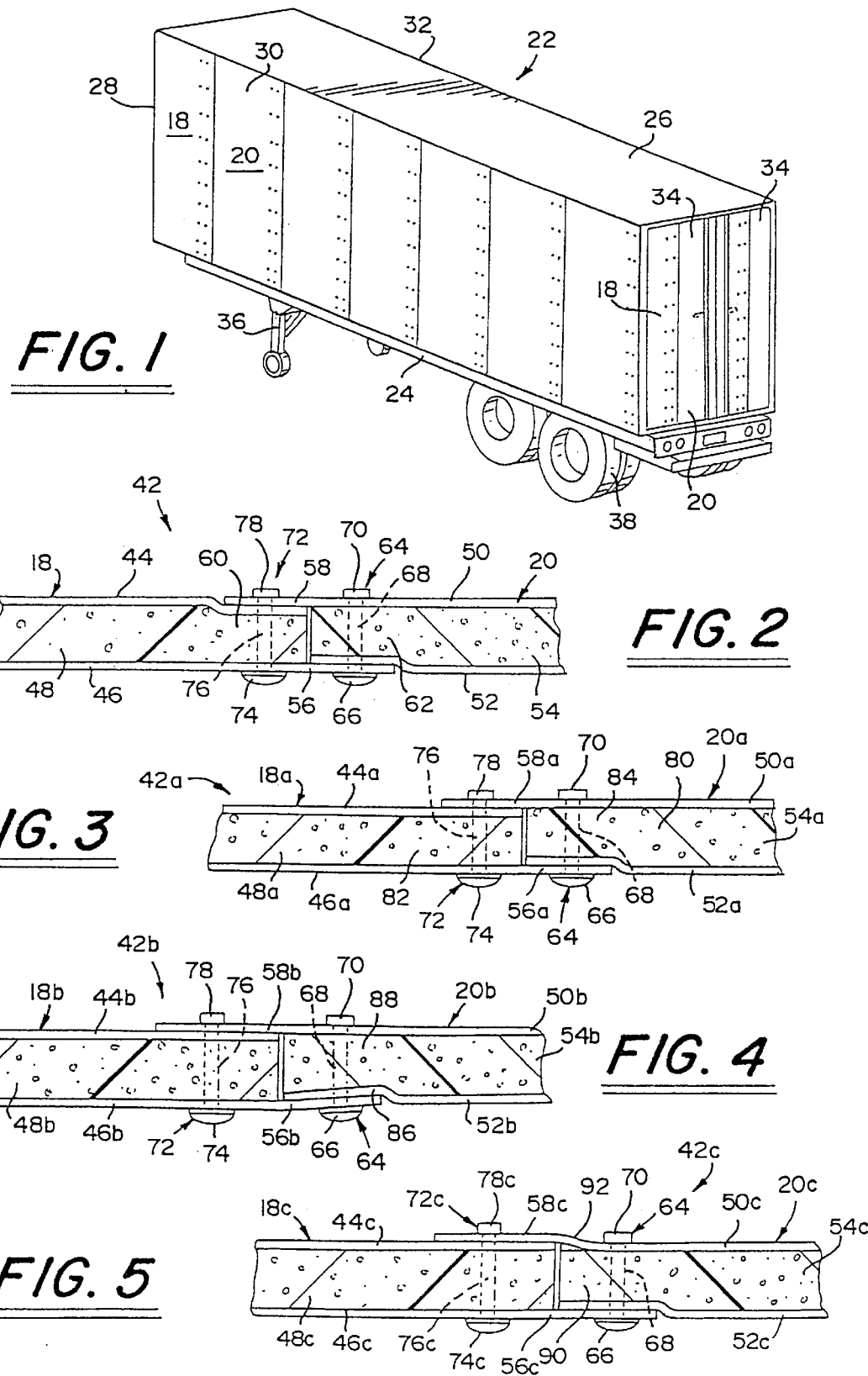

COINING OFFSET INTO EDGE OF COMPOSITE PLATE MEMBERS FOR FORMING TRAILER DOORS AND WALLS

BACKGROUND OF THE INVENTION

This invention is generally directed to a novel joint structure between composite plate members that are used to form trailer doors and side walls.

U.S. Pat. No. 4,940,279 discloses a joint configuration for connecting laminated panels together. First and second laminated panels are provided; each of which are formed from inner and outer skins having a plastic core member sandwiched therebetween. An overlapping member is integrally formed with the inner skin of the first panel and overlaps the inner skin of the second panel. An overlapping member is integrally formed with the outer skin of the second panel and overlaps the outer skin of the first panel. This joint configuration, while it has worked reliably in trailer constructions, does not provide substantially flush surfaces along the inner or outer surfaces of the joined panel members. This allows an article that is being placed in the trailer or an article exterior to the trailer to be caught on the ends of the panels which can lead to the skin being disengaged from the core member.

The present invention overcomes this problem and presents other features and advantages over the prior art which will become apparent upon a reading of the attached specification, in combination with an examination of the drawings.

OBJECTS AND SUMMARY OF THE INVENTION

A general object of the present invention is to provide a novel joint for connecting composite plate members together to form a trailer wall or door.

An object of the present invention is to provide a novel joint for connecting composite plate members together to form a trailer wall or door by coining or stepping an end portion of at least one of the plate members to be joined to form a substantially flush surface along the length of the plate members.

Briefly, and in accordance with the foregoing, the present invention discloses a trailer wall or door is formed from a plurality of first and second composite plate members, each having a novel joint therebetween. Each of the first and second composite plate members is formed from first and second metal skins having a compressible plastic core sandwiched therebetween. A first overlapping skin member is associated with the second skin of the first composite plate member for overlapping a portion of the second skin of the second composite plate member. A second overlapping skin member is associated with the first skin of the second composite plate member for overlapping a portion of the first skin of the first composite plate member. A portion of the second skin of the second composite plate member is stepped and the first overlapping skin member is seated thereagainst to provide a substantially flush surface therebetween. A first rivet member is engaged through the first overlapping member and the second composite plate member; a second rivet member is engaged through the second overlapping member and the first composite plate member. In accordance with one embodiment, a portion of the first skin of the first plate can also be stepped to define a second stepped end portion against which the first overlapping skin member seats against to form a substantially flush surface therebetween. In accordance with another embodiment, the first and second composite plate members can taper in thickness. In accordance with yet another embodiment, a depression can be formed in the second skin of the second composite plate member and an end of the first overlapping skin member can be seated therewithin to provide a substantially flush surface therebetween.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a perspective view of a trailer which incorporates the features of the invention;

FIG. 2 is a cross-sectional view of a first embodiment of a joint between a pair of plate members which are used to form a wall or door of the trailer shown in FIG. 1;

FIG. 3 is a cross-sectional view of a second embodiment of a joint between a pair of plate members which are used to form a wall or door of the trailer shown in FIG. 1;

FIG. 4 is a cross-sectional view of a third embodiment of a joint between a pair of plate members which are used to form a wall or door of the trailer shown in FIG. 1; and FIG. 5 is a cross-sectional view of a fourth embodiment of a joint between a pair of plate members which are used to form a wall or door of the trailer shown in FIG. 1.

DETAILED DESCRIPTION OF THE PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

In the present invention, a plurality of composite plate members 18, 20, for example, are used to form a wall or a door of a vehicle, such as a trailer 22, as shown in FIG. 1, van or the like. The trailer 22 is generally comprised of a floor 24, a roof 26, a front wall 28, a pair of opposite side walls 30, 32, rear cargo doors 34, a landing gear 36, and an undercarriage assembly 38. The trailer 22 may be connected to a tractor (not shown) by conventional means, such as a fifth wheel.

As shown in FIG. 1, each wall 28, 30, 32 of the trailer 22 is formed from a plurality of the composite plate members 18, 20, for example, which are joined together by a joint 42, 42a, 42b, 42c as described herein. The upper end of each composite plate member 18, 20 is connected to the roof 26 of the trailer 22 by an upper rail and extends downwardly therefrom. The upper end of each composite plate member 18, 20 is attached to the upper rail by suitable joining members, such as bolts or studs. The lower end of each composite plate member 18, 20 is connected to the floor 24 of the trailer 22 by a lower rail and extends upwardly therefrom. The lower end of each composite plate member 18, 20 is attached to the lower rail by suitable joining members, such as bolts or studs.

As also shown in FIG. 1, each rear cargo door 34 of the trailer 22 is formed from a plurality of the composite plate members 18, 20 which are joined together as described herein. The exterior edges of each composite plate member 18, 20 is connected to a frame by suitable joining members, such as bolts or studs, to form the doors 34. The interior edges of the composite plate members 18, 20 are joined together by the joint 42, 42a, 42b, 42c as described herein.

For purposes of clarity, the structure of the composite plate members is described with respect to the composite plate members 18 and 20 of side wall 30 and the structure of the joint is described with respect to the joint 42, 42a, 42b, 42c between composite plate members 18 and 20 of side wall 30, with the understanding the other composite plate members and the joints between such other composite plate members which form the trailer walls 28, 30, 32 and the cargo doors 34 are the same.

Composite plate member 18 has opposite ends and is formed from a first or outer metal skin 44 and a second or inner metal skin 46 which are bonded by a thin adhesive layer of a known flexible adhesive bonding film to a plastic core member 48, which is sandwiched therebetween. Composite plate member 20 has opposite ends and is formed from a first or outer metal skin 50 and a second or inner metal skin 52 which are bonded by a thin adhesive layer of a known flexible adhesive bonding film to a plastic core member 54 which is sandwiched therebetween.

An overlapping skin member 56 is provided for overlapping a portion of the second skin 52 of composite plate member 20 as described herein. Preferably, this overlapping skin member 56 is integrally formed as part of the second skin 46 of composite plate member 18, however, it is envisioned that the overlapping skin member 56 may be a separate member attached to composite plate member 18 by suitable means. The first skin 44 and the core member 48 are approximately the same in length and width. The overlapping skin member 56 extends outwardly from the first skin 44 and the core member 48 a predetermined distance.

An overlapping skin member 58 is provided for overlapping a portion of the first skin 44 of composite plate member 18 as described herein. Preferably, this overlapping skin member 58 is integrally formed as part of the first skin 50 of composite plate member 20, however, it is envisioned that the overlapping skin member 58 may be a separate member attached to composite plate member 20 by suitable means. The second skin 52 and the core member 54 are approximately the same in length and width. The overlapping skin member 58 extends outwardly from the second skin 52 and the core member 54 a predetermined distance.

The metal skins 44, 46, 50, 52 used in the composite plate members 18, 20 are preferably formed of aluminum or full hardened, high strength, high tension, galvanized steel. Preferably, each of the skins 44, 46, 50, 52 is formed from galvanized steel and preferably, each inner skin 46, 52 is over nineteen thousandths of an inch in thickness and each outer skin 44, 50 is over nineteen thousandths of an inch in thickness.

The core member 48, 54 provided in each composite plate member 18, 20 may be formed from a solid plastic core or may be formed from a foamed thermal plastic, such as foamed low density polyethylene and, preferably made from foamed high density polyethylene (HDPE or high density polypropylene. The core member 48, 54 is resilient and compressible. Such a foamed thermal plastic core is described in Applicant's co-pending patent application Ser. No. 08/942,173, entitled "Foamed Core Composite Plate member For Use In Trailer Walls and Doors", filed on Oct. 1, 1997, and which disclosure is herein incorporated by reference.

FIGS. 2–5 show first through fourth embodiments of the joint 42, 42a, 42b, 42c, respectively. Like reference numerals are used to denote like elements in each embodiment, with the suffix for the second embodiment being "a", for the third embodiment being "b" and for the fourth embodiment being "c".

Attention is now directed FIG. 2 which shows the first embodiment of the joint 42. To form the joint 42, initially, first and second composite plate members 18, 20 are provided. Initially, the plate members 18, 20 are equal in thickness along the length thereof.

Thereafter, an end portion of the first skin 44 of composite plate member 18 is coined or stepped by suitable means so as to form a stepped end portion 60. When the end portion of the plate member 18 is coined or stepped, the core member 48 is compressed between the skins 44, 46 and does not substantially extrude outwardly from the edge of the first skin 44. The first skin 44 is stepped a distance which is equal to the thickness of the overlapping skin member 58. Thus, the stepped end portion 60 has a thickness which is less than the thickness of the remainder of the composite plate member 18.

Next, an end portion of the second skin 52 of composite plate member 20 is coined or stepped by suitable means so as to form a stepped end portion 62. When the end portion of the plate member 20 is coined or stepped, the compressible core member 54 is compressed between skins 50, 52 and does not substantially extrude outwardly from the edge of the second skin 52. The second skin 52 is stepped a distance which is equal to the thickness of the overlapping skin member 56. Thus, the stepped end portion 62 has a thickness which is less than the thickness of the remainder of the composite plate member 20. The non-stepped or remainder portion of the composite plate member 20 has a thickness which is equal to the thickness of the non-stepped or remainder portion of composite plate member 18.

Thereafter, the ends of the composite plate member 18, 20 are placed against each other such that the ends of the core members 48, 54 generally abut against each other. The overlapping skin member 56 seats against the exterior surface of the stepped end portion 62 of the second skin 52. Because the stepped end portion 62 has been stepped a distance which is equal to the thickness of the overlapping skin member 56, the surface formed by the second skin 46 of composite plate member 18, the overlapping skin member 56, and the second skin 52 of composite plate member 20 is substantially flush. This prevents the overlapping skin member 56 from being snagged by an outside object. Preferably, this forms the interior surface of the trailer wall 28, 30, 32 or door 34. The overlapping skin member 58 seats against the exterior surface of the stepped end portion 60 of the first skin 44. Because the stepped end portion 60 has been stepped a distance which is equal to the thickness of the overlapping skin member 58, the surface formed by the first skin 44 of composite plate member 18, the overlapping skin member 58, and the first skin 50 of composite plate member 20 is substantially flush. This prevents the overlapping skin member 58 from being snagged by an outside object. Preferably, this forms the exterior surface of the trailer wall 28, 30, 32 or door 34.

A conventional rivet member 64 is then engaged through aligned holes provided through the overlapping skin member 56 and the stepped end portion 62 of the second composite plate member 20. The rivet member 64 includes a rounded head 66 and a shank 68 that extends therefrom. The rounded head 66 abuts against the outer surface of overlapping skin member 56 on the inside of the trailer 22. The end 70 of the rivet member 64 opposite to the head 66 is upset by conventional means to clamp the respective composite plate members 18, 20 between the head 66 and the end 70 of the rivet member 64. When upset, the end 70 abuts against the outer surface of first skin 50. A second conventional rivet member 72 is engaged through aligned holes provided through the stepped end portion 60 of the first composite plate member 18 and the overlapping skin member 58. The rivet member 72 includes a rounded head 74 and a shank 76 that extends therefrom. The rounded head 74 abuts against the outer surface of the second skin 46 on the inside of the trailer 22. The end 78 of the rivet member 72 opposite to the head 74 is upset by conventional means to clamp the respective composite plate members 18, 20 between the head 74 and the end 78 of the rivet member 72. When upset, the end 78 abuts against the outer surface of overlapping skin member 58. Because of the rounded nature of the heads 66, 74, no sharp or angled surfaces are presented to the interior of the trailer by the rivet members 64, 72. This feature combined with the flush mounting of the inner skin members 46, 52 provides an inner surface for the wall or door that is substantially flush and free of sharp corners or edges. Further, the ends 70, 78 may also be upset to a rounded configuration to produce blum similar in shape to heads 74, 66.

Attention is now directed to FIG. 3 which shows the second embodiment of the joint 42a. To form the joint 42a, initially, first and second composite plate members 18a, 20a are provided. Each plate member 18a, 20a generally tapers from a first end 80 to a second end 82, with the first end 80 having a predetermined thickness which equal the thickness of the skin members and the core and the second end 82 having a thickness of the predetermined thickness of the first end minus the thickness of one skin. As shown in FIG. 3, the second, smaller thickness end 82 of composite plate member 18a is shown (and the first, greater thickness end of composite plate member 18a has been broken away and is not shown therein) and the first, greater thickness end 82 of composite plate member 20a is shown (and the second, smaller thickness end of composite plate member 20a has been broken away and is not shown therein).

Thereafter, an end portion of the second skin 52a at the first, greater thickness end 80 of composite plate member 20a is coined or stepped by suitable means so as to form a stepped end portion 84. When the end portion of the plate member 20a is coined or stepped, the core member 54a is compressed between the skins 50a, 52a and does not substantially extrude outwardly from the edge of the second skin 52a. The second skin 52a is stepped a distance which is equal to the thickness of the overlapping skin member 56a. Thus, the stepped end portion 84 has a thickness which is less than the thickness of the remainder of the composite plate member 20a.

The second, smaller thickness end 82 of composite plate member 18a is abutted against the first, greater thickness end 80 of composite plate member 20a such that the ends of the core members 48a, 54a generally abut against each other. The overlapping skin member 56a seats against the exterior surface of the stepped end portion 84 of the second skin 52a. Because the stepped end portion 84 has been stepped a distance which is equal to the thickness of the overlapping skin member 56a, the surface formed by the second skin 46a of composite plate member 18a, the overlapping skin member 56a, and the second skin 52a of composite plate member 20a is substantially flush. This prevents the overlapping skin member 56a from being snagged by an outside object. Preferably, this forms the interior surface of the trailer wall 28, 30, 32 or door 34. The overlapping skin member 58a seats against the exterior surface of the first skin 44a of composite plate member 18a. Preferably, this forms the exterior surface of the trailer wall 28, 30, 32 or door 34.

A pair of conventional rivet members 64, 72, identical to those employed in the first embodiment, are then engaged with the plate members 18a, 20a to clamp the plate members 18a, 20a in assembled relation. Rivet member 64 is engaged through aligned holes provided through the overlapping skin member 56a and the stepped end portion 84 of the second composite plate member 20a. The head 66 abuts against the outer surface of overlapping skin member 56a on the inside of the trailer 22. The end 70 of the rivet member 64 opposite to the head 66 is upset by conventional means to clamp the plate members 18a, 20a together. When upset, the end 70 abuts against the outer surface of first skin 50a. Rivet member 72 is engaged through aligned holes provided through the end portion of the first composite plate member 18a and the overlapping skin member 58a. The head 74 abuts against the outer surface of the second skin 46a on the inside of the trailer 22. The end 78 of the rivet member 72 opposite to the head 74 is upset by conventional means to clamp the plate members 18a, 20a together. When upset, the end 78 abuts against the outer surface of overlapping skin member 58a.

To add further plate members, the second, smaller thickness end of one further plate member is abutted against the first, larger thickness end (not shown) of composite plate member 18a, and the first, larger thickness end of another further plate member is abutted against the second, smaller thickness end (not shown) of composite plate member 20a. This process is repeated to form the wall or door.

Attention is now directed to FIG. 4 which shows the third embodiment of the joint 42b. To form the joint 42b, initially, first and second composite plate members 18b, 20b are provided. Initially, the plate members 18b, 20b are equal in thickness along the length thereof.

Thereafter, a depression 86 is formed in the second skin 52b of composite plate member 20b by coining or stepping the skin 52b by suitable means so as to form a stepped end portion 88. The depression 86 is formed at a position which is spaced from the end of skin 52b such that the plate member 20b has equal thickness on both sides of the depression 86 and the depression 86 forms a portion of the plate member 20b which has a lesser thickness. The depression 86 has a maximum depth which is equal to the thickness of the overlapping skin member 56b. When the depression 86 is formed in the end portion of the plate member 20b, the core member 54b is compressed between the skins 50b, 52b and does not substantially extrude outwardly from the edge of the second skin 52b.

The ends of the composite plate members 18b, 20b are abutted against each other such that the ends of the core members 48b, 54b generally abut against each other. The end of the overlapping skin member 56b seats within the depression 86 against the exterior surface of the stepped end portion 88 of the second skin 52b. Because the maximum depth of the depression 86 is equal to the thickness of the overlapping skin member 56b, the surface formed between the second skin 52b and the end of the overlapping member 56b is substantially flush. This prevents the end of the overlapping skin member 56b from being snagged by an outside object. Preferably, this forms the interior surface of the trailer wall 28, 30, 32 or door 34. The overlapping skin member 58b seats against the exterior surface of the first skin 44b of composite plate member 18b. Preferably, this forms the exterior surface of the trailer wall 28, 30, 32 or door 34. This does not form a substantially flush surface, however, it is to be understood that the end portion of composite plate member 18b could have a depression, like depression 86, formed therein for acceptance of the end of the overlapping skin member 58b therein to form a substantially flush surface between first skin 44b and the end of the overlapping skin member 58b.

A pair of conventional rivet members 64, 72, identical to those employed in the first embodiment, are then engaged with the plate members 18b, 20b to clamp the plate members 18b, 20b in assembled relation. Rivet member 64 is engaged through aligned holes provided through the overlapping skin member 56b and the stepped end portion 88 of the second composite plate member 20b. The head 66 abuts against the outer surface of overlapping skin member 56b on the inside of the trailer 22. The end 70 of the rivet member 64 opposite to the head 66 is upset by conventional means to clamp the plate members 18b, 20b together. When upset, the end 70 abuts against the outer surface of first skin 50b. Rivet member 72 is engaged through aligned holes provided through the end portion of the first composite plate member 18b and the overlapping skin member 58b. The head 74 abuts against the outer surface of the second skin 46b on the inside of the trailer 22. The end 78 of the rivet member 72 opposite to the head 74 is upset by conventional means to clamp the plate members 18b, 20b together. When upset, the end 78 abuts against the outer surface of overlapping skin member 58b.

Attention is now directed FIG. 5 which shows the fourth embodiment of the joint 42c. To form the joint 42c, initially, first and second composite plate members 18c, 20c are provided. Initially, the plate members 18c, 20c are equal in thickness along the length thereof.

Thereafter, an end portion of the second skin 52c of composite plate member 20c is coined or stepped by suitable means so as to form a stepped end portion 90. When the end portion of the plate member 20c is coined or stepped, the compressible core member 54c is compressed between skins 50c, 52c and does not substantially extrude outwardly from the edge of the second skin 52c. The second skin 52c is stepped a distance which is equal to the thickness of the overlapping skin member 56c. Thus, the stepped end portion 90 has a thickness which is less than the thickness of the remainder of the composite plate member 20c. The non-stepped or remainder portion of the composite plate member 20c has a thickness which is equal to the thickness of the non-stepped or remainder portion of composite plate member 18c.

Thereafter, the ends of the composite plate member 18c, 20c are placed against each other such that the ends of the core members 48c, 54c generally abut against each other. The overlapping skin member 56c seats against the exterior surface of the stepped end portion 90 of the second skin 52c. Because the stepped end portion 90 has been stepped a distance which is equal to the thickness of the overlapping skin member 56c, the surface formed by the second skin 46c of composite plate member 18c, the overlapping skin member 56c, and the second skin 52c of composite plate member 20c is substantially flush. This prevents the overlapping skin member 56c from being snagged by an outside object. Preferably, this forms the interior surface of the trailer wall 28, 30, 32 or door 34. The overlapping skin member 58c seats against the exterior surface of the first skin 44c. A bend 92 is formed in overlapping skin member 58c to allow it to seat against the exterior surface of the first skin 44c. This does not form a substantially flush surface between overlapping skin member 58c and first skin 44c. Preferably, this forms the exterior surface of the trailer wall 28, 30, 32 or door 34.

A conventional rivet member 64, identical to that of the first embodiment, is then engaged through aligned holes provided through the overlapping skin member 56c and the stepped end portion 90 of the second composite plate member 20c. The head 66 abuts against the outer surface of overlapping skin member 56c on the inside of the trailer 22. The end 70 of the rivet member 64 opposite to the head 66 is upset by conventional means to clamp the plate members 18c, 20c together. When upset, the end 70 abuts against the outer surface of first skin 50c.

A second conventional rivet member 72c, which has a shank that is slightly longer than the first rivet member 64, is engaged through aligned holes provided through the end portion of the first composite plate member 18c and the overlapping skin member 58c. The rivet member 72c is formed from a head 74c and a shank 76c that extends therefrom. The head 74c abuts against the outer surface of the second skin 46c on the inside of the trailer 22. The end 78c of the rivet member 72c opposite to the head 74c is upset by conventional means to clamp the plate members 18c, 20c together. When upset, the end 78c abuts against the outer surface of overlapping skin member 58c.

In each embodiment, a plurality of pairs of rivets 64, 72; 64, 72c are used to clamp the composite plate members 18, 20 together to form the trailer 22, see FIG. 1. The double row of rivets 64, 72; 64, 72c securely clamps the composite plate members together and prevents the overlapping members from peeling away from the stepped portions if the overlapping members get snagged by an outside object.

It is to be understood that instead of coining the ends of the plate members to form the stepped end portions, the portion of the skin member which is stepped is removed to form the stepped end portion and the overlapping skin member lays against the core member of the composite plate member. For example, instead of coining the end of the plate member 20a to form the stepped end portion 84, the portion of the skin member 52a which is stepped is removed to form the stepped end portion 84 and the overlapping skin member 56a lays against the core member 54a of the composite plate member 20a. With this embodiment, the core member does not need to be compressed to form the stepped end portion.

It is envisioned that the heads 66, 74, 74c of the rivets 64, 72, 72c can be seated in depressions formed in the members against which they abut so as to provide a substantially flush surface along the interior of the trailer 22. Such depressions can be formed by coining.

While the trailer 22 has been described with respect to only having plate members arranged vertically, it is to be understood that the joint could be provided horizontally instead of vertically. If a horizontal joint is provided, upper and lower composite plate members are provided. Also, a horizontal joint and a plurality of vertical joints may be used.

While preferred embodiments of the present invention are shown and described, it is envisioned that those skilled in the art may devise various modifications of the present invention without departing from the spirit and scope of the appended claims.

The invention claimed is:

1. A joint for joining plate members together for use in forming a trailer wall or trailer door, said joint comprising: a first composite plate member having first and second opposite ends and including first and second metal skins with a plastic core sandwiched therebetween; a second composite plate member having first and second opposite ends and including first and second metal skins with a plastic core sandwiched therebetween, at least one of said inner and outer skins of said second composite plate having an end portion which is stepped so as to compress said plastic core between said inner and outer skins and to define a stepped end portion; a first overlapping skin member associated with said second skin of said first composite plate member for overlapping a portion of said second skin of said second composite plate member; a second overlapping skin member associated with said first skin of said second composite plate member for overlapping a portion of said first skin of said first composite plate member; and joining means for joining said first composite plate member and said second composite plate member together.

2. A joint as defined in claim 1, wherein said joining means comprises a first rivet member engaged through said first overlapping member and said second composite plate member and a second rivet member engaged through said second overlapping member and said first composite plate member.

3. A joint as defined in claim 1, wherein an end portion of said second skin of said second composite plate member is stepped to define said stepped end portion and said first overlapping skin member seats against said stepped portion to provide a substantially flush surface along the length of said second skins.

4. A joint as defined in claim 3, wherein said second skin of said first composite plate member has a predetermined thickness and said portion of said second skin of said second composite plate member is stepped a thickness which is equal to said thickness of said second skin of said first composite plate member.

5. A joint as defined in claim 1, wherein said first composite plate member and the portion of said second composite plate member which does not have the stepped end portion have thicknesses which are approximately equal.

6. A joint as defined in claim 1, wherein each of said first and second composite plate members tapers in thickness to said stepped end portion, and said second end of said second composite plate member abuts against the first end of said first composite plate member.

7. A joint as defined in claim 1, wherein an end portion of said first skin of said first composite plate member is stepped to define a second stepped end portion and said second overlapping skin member seats against said second stepped portion to provide a substantially flush surface along the length of said first skins.

8. A joint as defined in claim 7, wherein said first skin of said second composite plate member has a predetermined thickness and said portion of said first skin of said first composite plate member is stepped a thickness which is equal to said thickness of said first skin of said second composite plate member.

9. A joint as defined in claim 7, wherein the portions of said first and second composite plate members which are not stepped have thicknesses which are approximately equal.

10. A joint as defined in claim 1, wherein said second skin of said second composite plate member has a depression formed therein which is spaced from an end of said second composite plate member to form said stepped end portion and an end of said first overlapping skin member is seated within said depression.

11. A joint as defined in claim 10, wherein said first composite plate member and the portion of said second composite plate member which does not have the depression therein have thicknesses which are approximately equal.

12. A joint as defined in claim 10, wherein said second skin of said first composite plate member has a predetermined thickness and said depression in said second composite plate member has a maximum thickness which is equal to said thickness of said second skin of said first composite plate member.

13. A joint as defined in claim 1, wherein said first overlapping skin member is integrally formed with said second skin of said first composite plate member.

14. A joint as defined in claim 1, wherein said second overlapping skin member is integrally formed with said first skin of said second composite plate member.

15. A joint as defined in claim 1, wherein said first overlapping skin member is integrally formed with said second skin of said first composite plate member and said second overlapping skin member is integrally formed with said first skin of said second composite plate member.

16. A joint as defined in claim 1, wherein each said plastic core is formed from one of high and low density polypropylene and high and low density polyethylene.

17. A joint as defined in claim 1, wherein each said plastic core is formed from foamed thermal plastic.

18. A joint as defined in claim 1, wherein each said skin and each said overlapping member is formed from one of aluminum and steel.

* * * * *